United States Patent
Germenis

(10) Patent No.: US 12,274,391 B1
(45) Date of Patent: Apr. 15, 2025

(54) PORTABLE BOTTLE INFUSER

(71) Applicant: Spyros Germenis, Roosevelt, NY (US)

(72) Inventor: Spyros Germenis, Roosevelt, NY (US)

( * ) Notice: Subject to any disclaimer, the term of this patent is extended or adjusted under 35 U.S.C. 154(b) by 0 days.

(21) Appl. No.: 18/883,694

(22) Filed: Sep. 12, 2024

(51) Int. Cl.
*A47J 31/00* (2006.01)
*A47J 31/06* (2006.01)
*A47J 31/46* (2006.01)

(52) U.S. Cl.
CPC ......... *A47J 31/005* (2013.01); *A47J 31/0605* (2013.01); *A47J 31/461* (2018.08)

(58) Field of Classification Search
CPC ..... A47J 31/005; A47J 31/461; A47J 31/0605
See application file for complete search history.

(56) References Cited

U.S. PATENT DOCUMENTS

| | | | | |
|---|---|---|---|---|
| 5,215,659 | A * | 6/1993 | Ando | A47J 31/605 |
| | | | | 210/282 |
| 2005/0199129 | A1 | 9/2005 | Glucksman et al. | |
| 2007/0221067 | A1 * | 9/2007 | Scelza | A47J 31/0576 |
| | | | | 99/279 |
| 2015/0164261 | A1 | 6/2015 | Fukumura | |
| 2017/0280919 | A1 * | 10/2017 | He | A47J 31/306 |
| 2018/0228313 | A1 * | 8/2018 | Cailleton | A47J 31/462 |
| 2018/0352993 | A1 * | 12/2018 | Yoon | A47J 31/18 |
| 2019/0090680 | A1 * | 3/2019 | Urciuoli | A47J 31/468 |
| 2019/0191913 | A1 * | 6/2019 | Richardson | A47J 31/005 |
| 2019/0200800 | A1 * | 7/2019 | Redington | A47J 31/005 |
| 2020/0093313 | A1 * | 3/2020 | Larsen | A47J 31/18 |
| 2020/0305632 | A1 | 10/2020 | Kubersky | |
| 2021/0022544 | A1 * | 1/2021 | Gray | A47J 31/38 |
| 2021/0361107 | A1 * | 11/2021 | Lyu | A47J 31/20 |
| 2021/0386235 | A1 | 12/2021 | Kuo et al. | |
| 2022/0395128 | A1 | 12/2022 | Leach et al. | |
| 2023/0371732 | A1 * | 11/2023 | Merrigan | A47J 31/005 |
| 2023/0404315 | A1 * | 12/2023 | Zhou | A23F 5/262 |

FOREIGN PATENT DOCUMENTS

| CN | 111743404 A | * 10/2020 |
|---|---|---|
| KR | 20180129043 A | * 12/2018 |

OTHER PUBLICATIONS

CN 111743404 A—Translation (Year: 2024).*
KR20180129043A—Translation (Year: 2024).*
Wacaco, Portable Coffee Maker Pipamoka, retrieved from Internet, retrieved on Sep. 11, 2024, <URL: https://www.wacaco.com/products/pipamoka>.

* cited by examiner

*Primary Examiner* — Jeffrey T Carley
*Assistant Examiner* — Keith Brian Assante

(57) ABSTRACT

The portable bottle infuser has a top housing, a top cap, a bottom plate, a bottom housing, a cup, and a bottom cap. The top housing and bottom housing are both cylindrical shaped chambers that form one bottle. The top housing has a valve plate and a means for connecting to the top cap and bottom housing. The top cap fits along the top housing. The bottom plate engages with the valve plate to control the flow of liquid within the bottle. The bottom housing has a bottom internal lip, a screen housing, and a means for connecting to the bottom cap and the top housing. The bottom housing is designed to hold coffee grounds and tea leaves for infusing or steeping with a hot liquid stored within the top housing.

16 Claims, 10 Drawing Sheets

PORTABLE BOTTLE INFUSER

FIELD OF THE INVENTION

The present invention relates generally to a bottle for making coffee and tea. More specifically the present invention is a portable device that can steep and infuse a coffee and tea with a hot liquid.

BACKGROUND OF THE INVENTION

Tea and coffee infusers are essential tools for brewing beverages, allowing for a more personalized and controlled infusion process compared to pre-packaged tea bags or coffee pods. These infusers come in various designs and materials, catering to different preferences and brewing methods. Tea infusers, often made from stainless steel, silicone, or mesh, are used to hold loose leaf tea while steeping in hot water. They come in many forms, such as ball-shaped strainers, basket infusers, and even novelty shapes like animals or flowers, making the brewing process both functional and enjoyable. Coffee infusers, on the other hand, include devices like French presses, pour-over cones, and single-serve brewing systems that enable users to control the strength and flavor of their coffee by adjusting the number of coffee grounds and water temperature.

The use of tea and coffee infusers not only enhances the flavor and quality of the beverages but also promotes sustainability by reducing the reliance on single-use bags and pods. With tea infusers, the loose leaves have more room to expand and release their full flavor, resulting in a richer and more aromatic cup of tea. Similarly, coffee infusers allow for a more hands-on brewing experience, where coffee enthusiasts can experiment with different grind sizes and brewing times to achieve their preferred taste profile. Moreover, these infusers are generally easy to clean and maintain, often being dishwasher safe or simple to rinse out, making them a convenient addition to any kitchen.

DETAILED DESCRIPTION OF THE INVENTION

All illustrations of the drawings are for the purpose of describing selected versions of the present invention and are not intended to limit the scope of the present invention.

Figure 1:
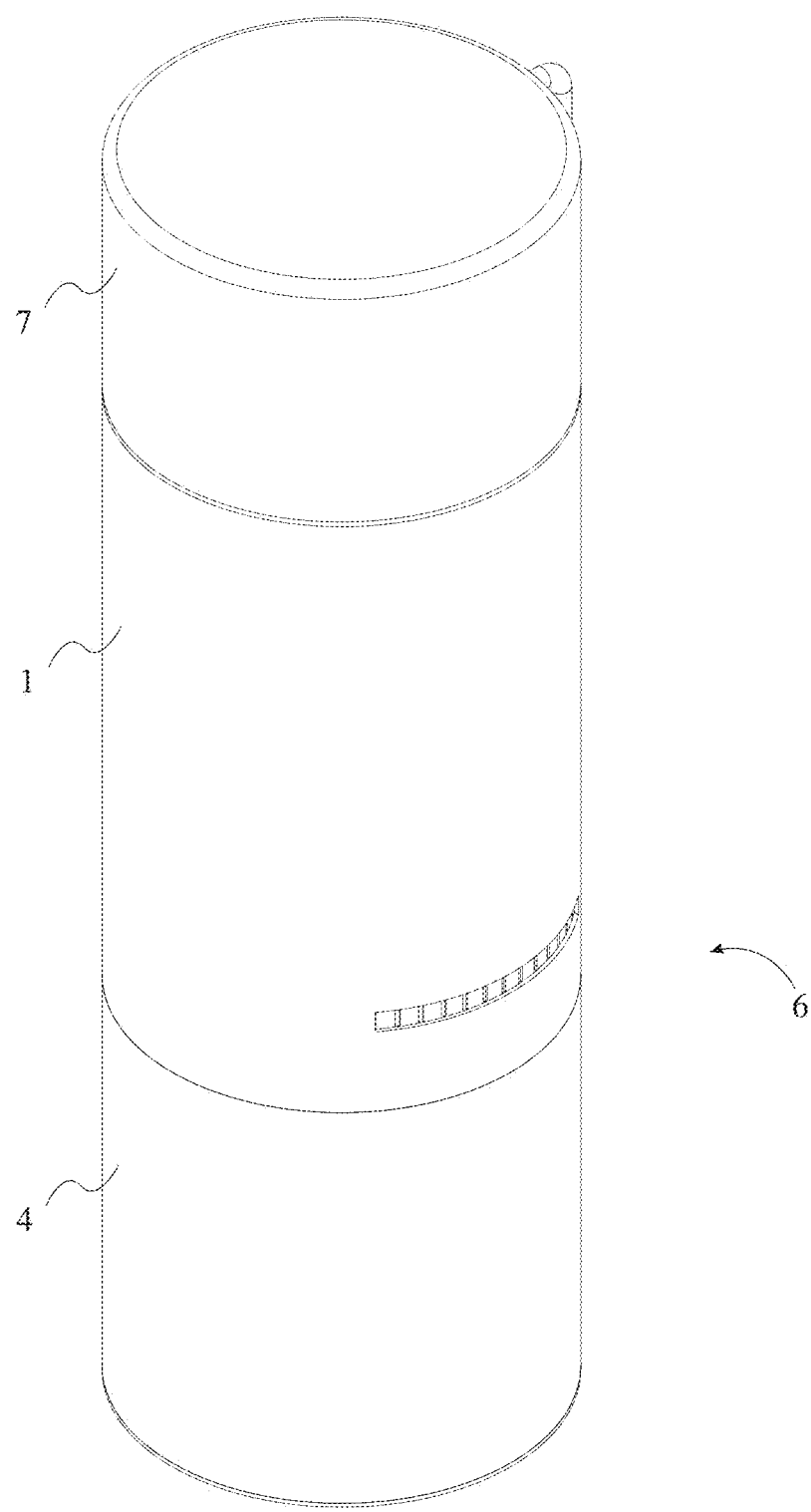
FIG. 1 is a top front right perspective view of the present invention.
Figure 2:
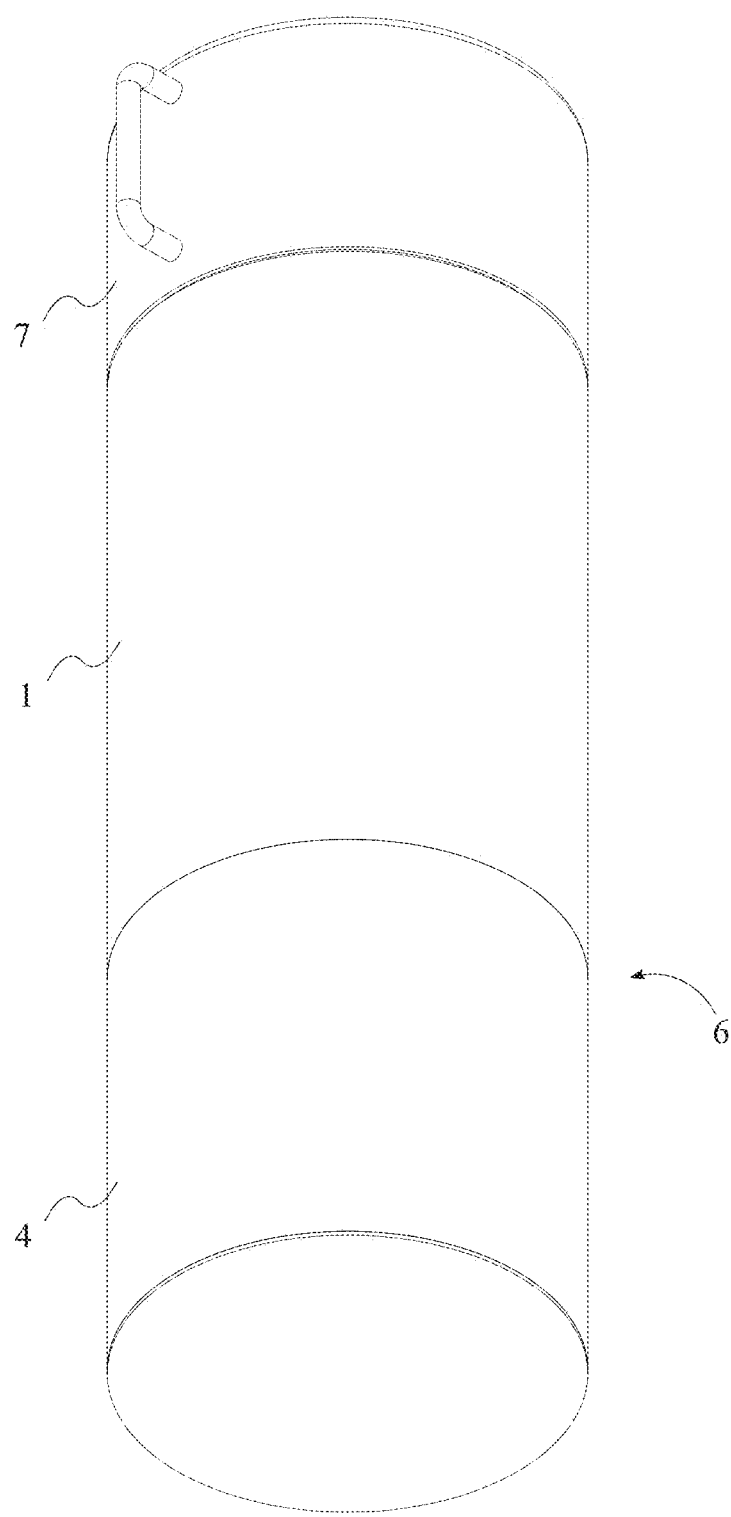
FIG. 2 is a bottom rear left perspective view of the present invention.

In reference to FIG. 1-10, the present invention comprises a top housing 1, a top cap 2, a bottom plate 3, a bottom housing 4, a cup 7, and a bottom cap 5. The top housing 1 and bottom housing 4 are both cylindrical shaped chambers. The bottom plate 3 is a circular shaped plate. The top housing 1 comprises a top housing outer thread 11, a housing slot 12, a valve plate 13, and a bottom housing connecting thread 14. The valve plate 13 is a circular shaped plate. The housing slot 12 is a rectangular shaped opening. The top cap 2 comprises a top cap inner thread 21. The bottom plate 3 comprises a plurality of ridges 31, a plurality of plate slots 32, and a plate groove 34. The plate groove 34 is a ring-shaped gap. The bottom housing 4 comprises a bottom housing inner thread 41, a bottom internal lip 42, a screen housing 43, a top housing connecting thread 44, and a valve shaft 33. The bottom cap 5 comprises a bottom cap outer thread 51 and a bottom cap gasket 52. The top housing 1 and bottom housing 4 forms a bottle housing 6. Accordingly, the bottle housing 6 is designed with a firm material with a low head conductivity value to retain heat within the bottle housing 6. The top cap 2 closes along the top of the top housing 1. Consequently, the top cap 2 seals the bottle housing 6 closed, ensuring that liquid does not leak out as the bottle housing 6 is flipped upside down or placed on a side. The bottom cap 5 closes along the bottom of the bottom housing 4. As a result, the bottom cap 5 seals the bottom side of the bottle housing 6, ensuring that no liquid leaks out when the bottle housing 6 is positioned upwards as seen in FIG. 1. The bottom plate 3 seals between the valve plate 13 and the screen housing 43. Thus, the bottom plate 3 prevents liquid from flowing from the top housing 1 to the bottom housing 4 and vice versa. The cup 7 further comprises a handle. The cup 7 is designed to receive liquid poured out from the bottle housing 6 when the top cap 2 is removed.

Figure 3:
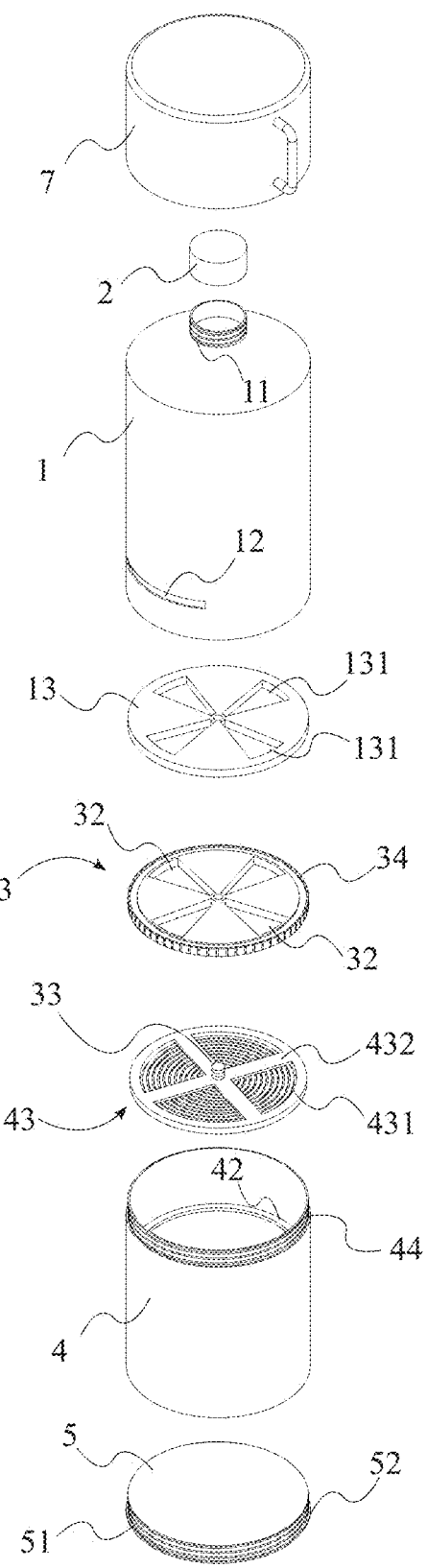
FIG. 3 is a front top left perspective view of the present invention in an exploded configuration.

In reference to FIG. 3, the top housing outer thread 11 is a spiraling thread along the end of the top housing 1. The top housing outer thread 11 receives the top cap 2. The top cap inner thread 21 interlocks with the top housing outer thread 11. So, the top cap 2 turns and tightens along the top housing outer thread 11 to seal the top of the top housing 1. The bottom housing connecting thread 14 is a spiraling thread along the end of the top housing 1 opposite the top housing outer thread 11. The bottom housing connecting thread 14 receives the bottom housing 4. Accordingly, the bottom housing 4 interlocks along the bottom housing connecting thread 14 forming a seal to form the bottle housing 6. The housing slot 12 integrates along the top housing 1. Consequently, the housing slot 12 forms a seal that prevents liquid from exiting the bottle housing 6 through the housing slot 12. The housing slot 12 reveals the plurality of ridges 31 along the bottom plate 3. As a result, the plurality of ridges 31 is accessible to rotate the bottom plate 3 from outside of the bottle housing 6.

Figure 4:
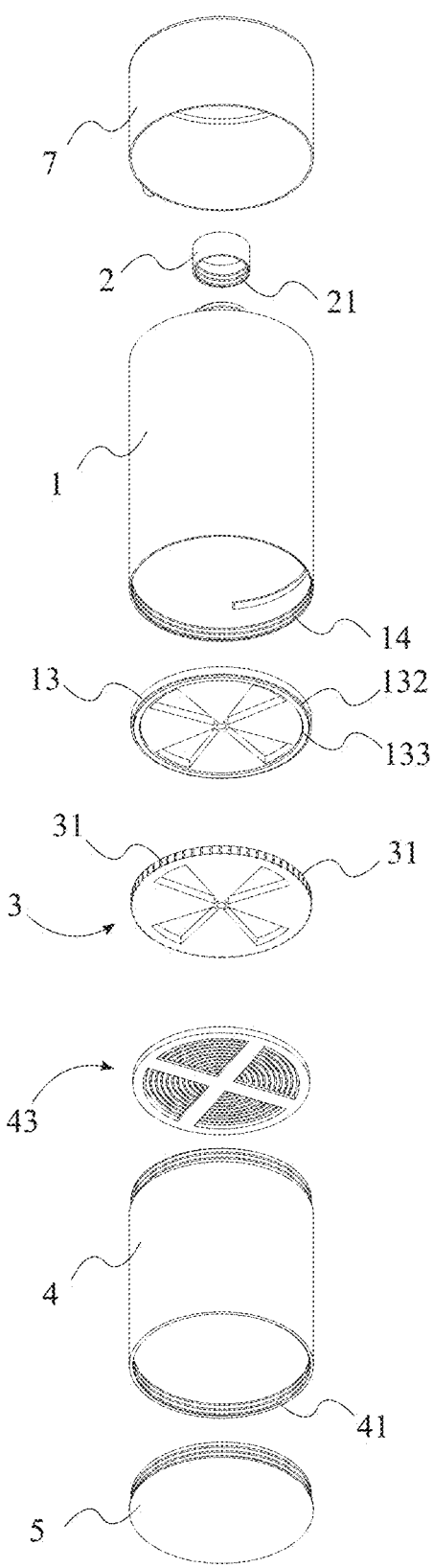
FIG. 4 is a bottom rear right top right perspective view of the present invention in an exploded configuration.
Figure 5:
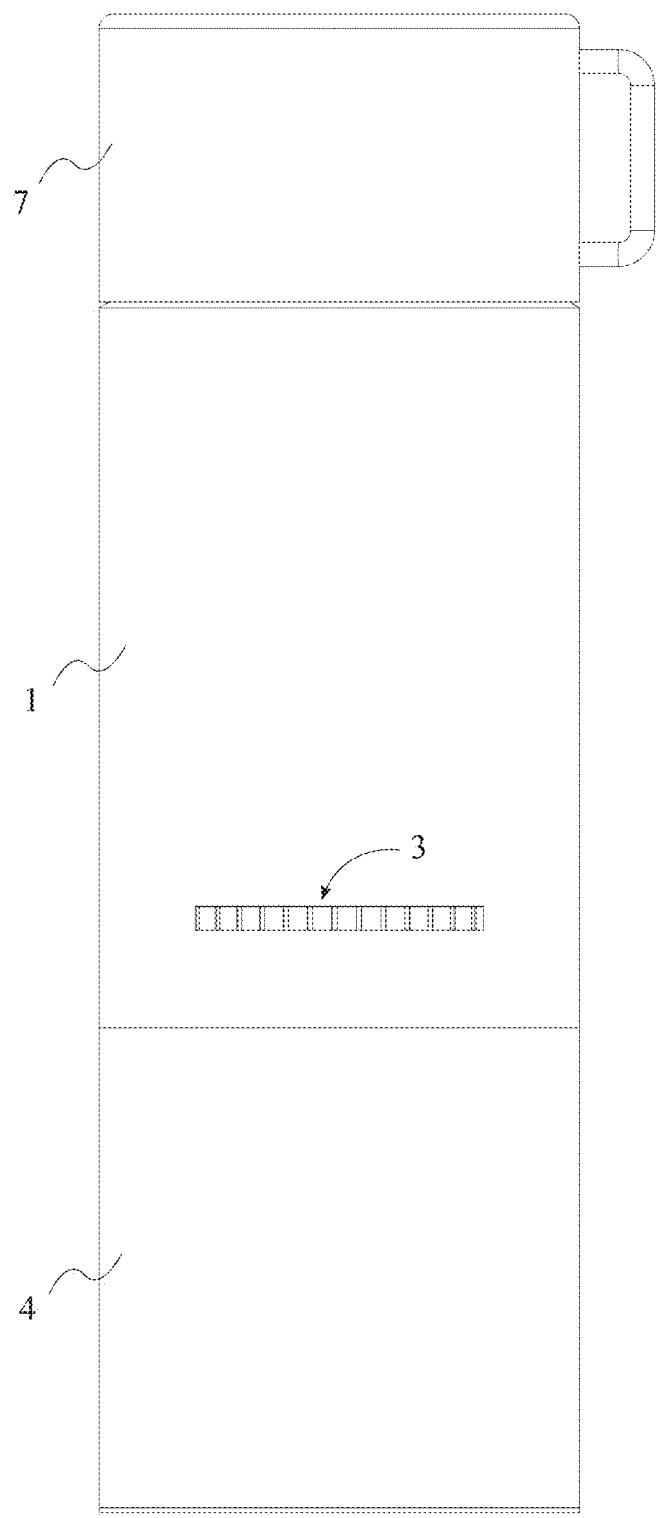
FIG. 5 is a front view of the present invention.
Figure 6:
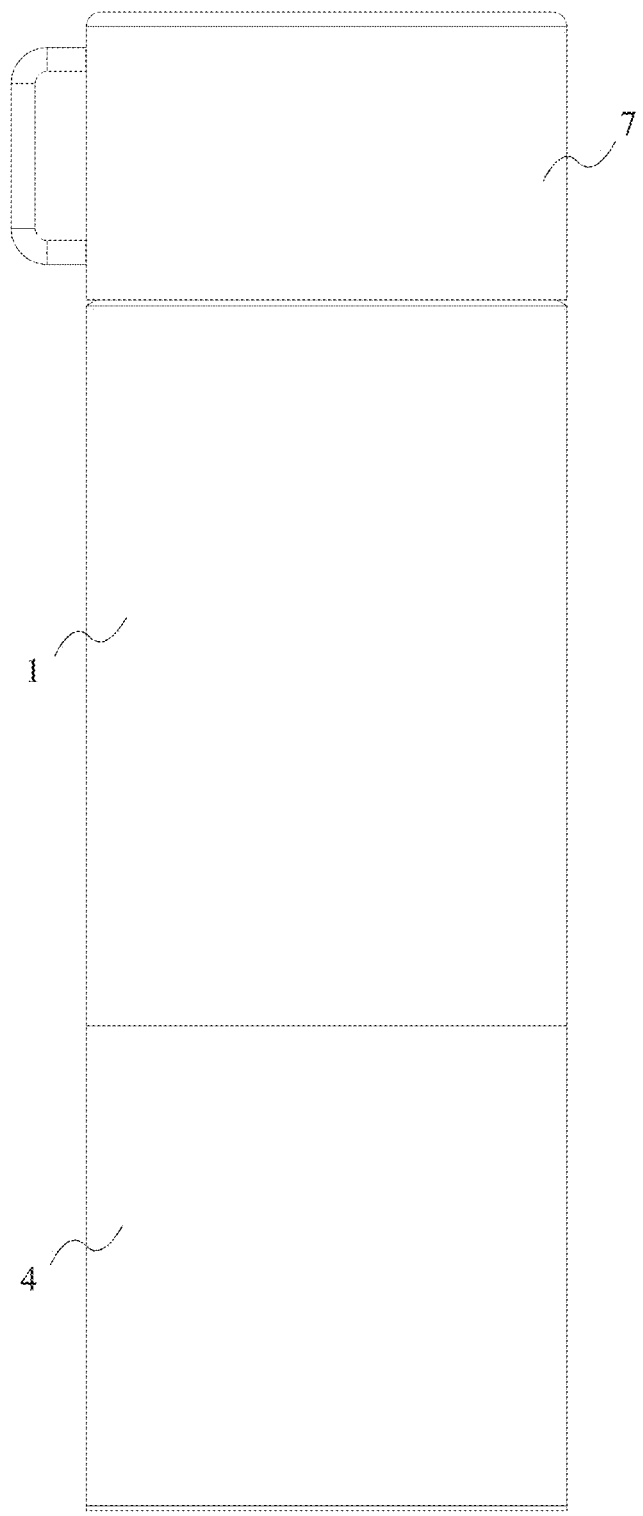
FIG. 6 is a rear view of the present invention.
Figure 7:
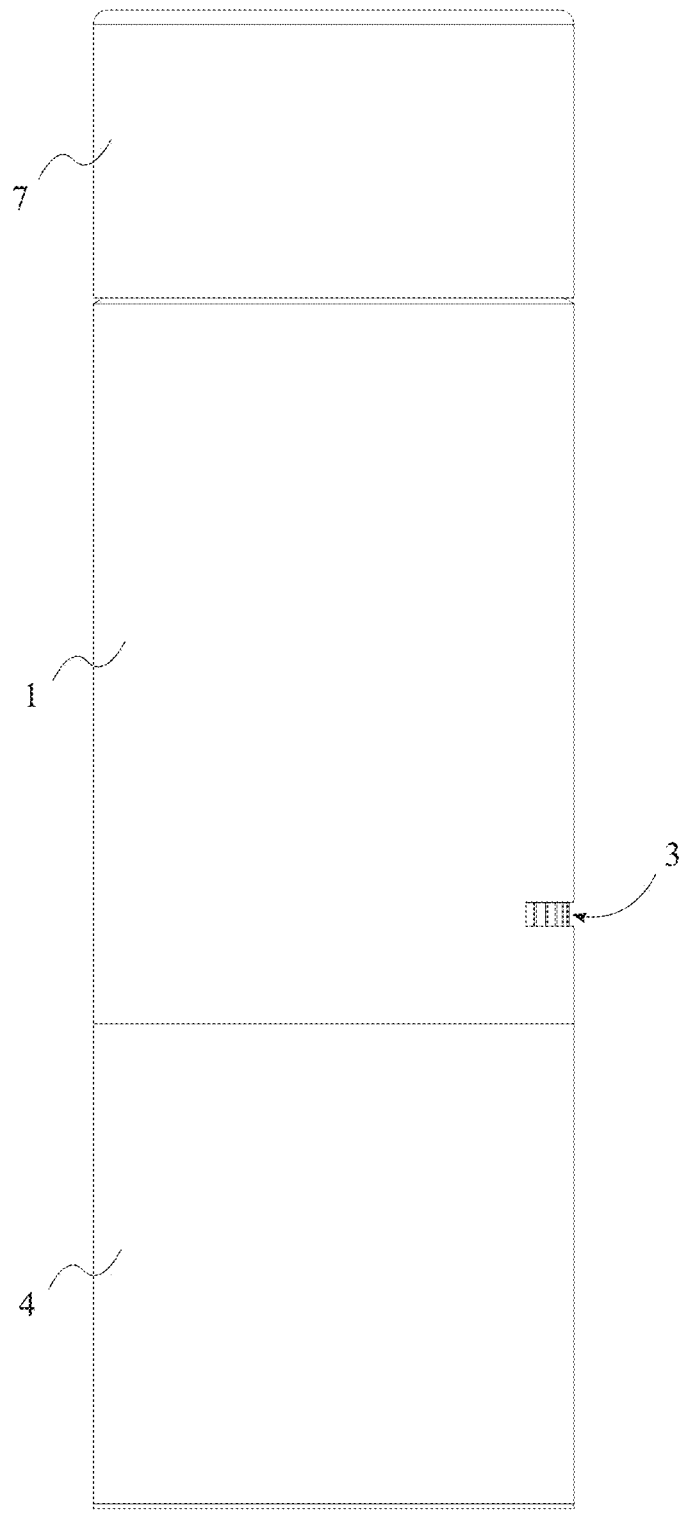
FIG. 7 is a left-side view of the present invention.
Figure 8:
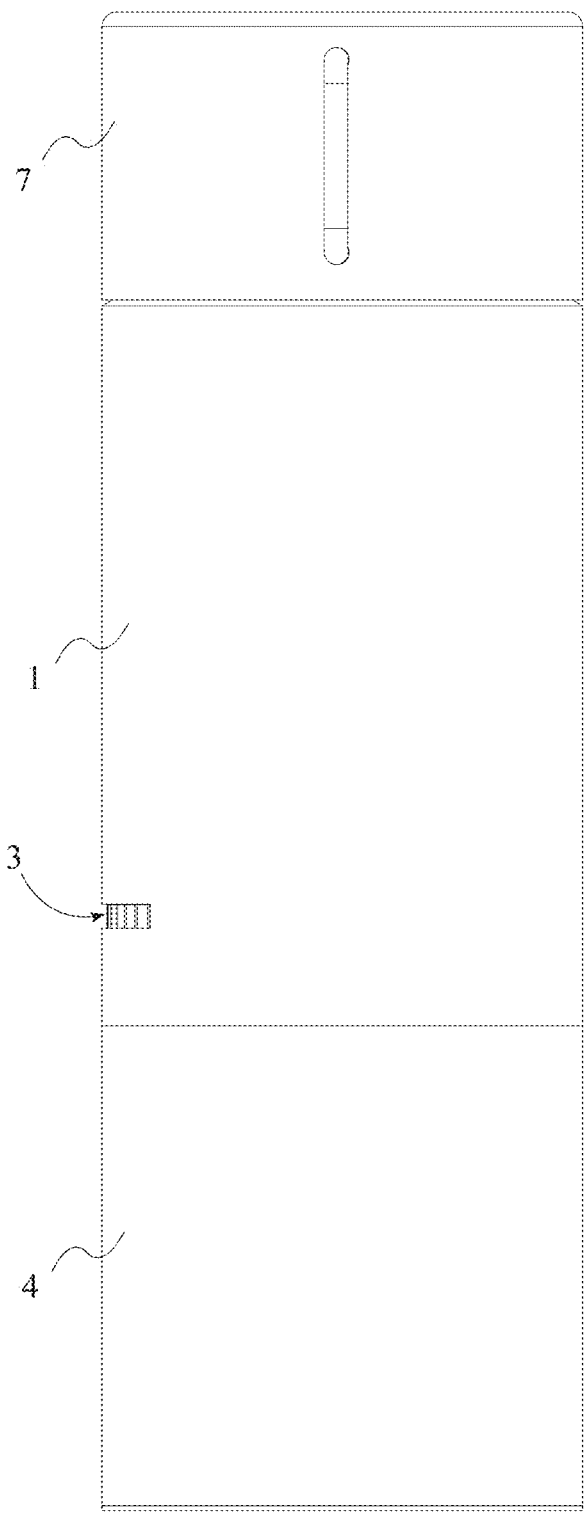
FIG. 8 is a right-side view of the present invention.
Figure 9:
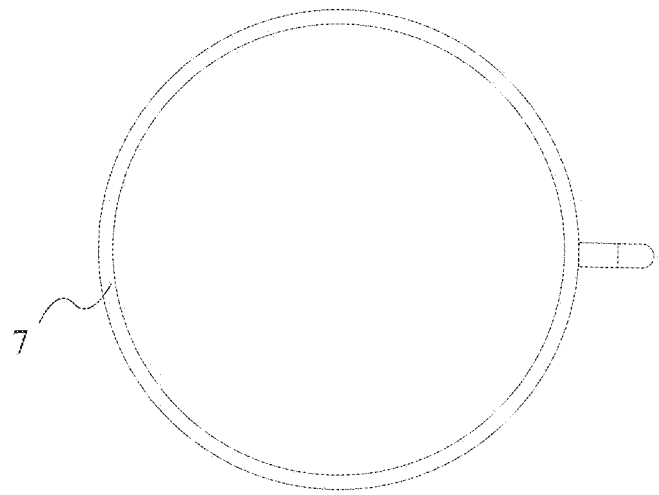
FIG. 9 is a top view of the present invention.
Figure 10:
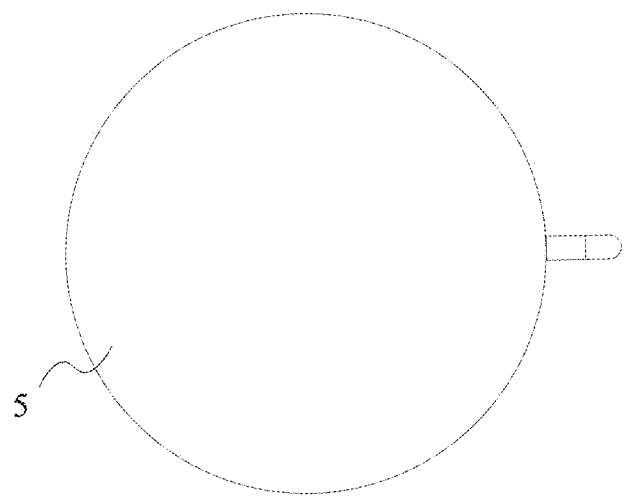
FIG. 10 is a bottom view of the present invention.

In reference to FIG. 4, the valve plate 13 further comprises a plurality of valve slots 131, a valve bottom groove 132, and a valve gasket 133. The valve plate 13 affixes along the inner surface of the top housing 1. Thus, the valve plate 13 is fixed within the top housing 1 and does not rotate. The valve plate 13 is positioned above the housing slot 12. So, the valve plate 13 prevents liquid from seeping through the housing slot 12.

Further, the plurality of valve slots 131 traverses through the valve plate 13. Accordingly, the plurality of valve slots 131 enables liquid to pass flow throughout the top housing 1. The valve bottom groove 132 integrates into the bottom surface of the valve plate 13 as shown in FIG. 4. Consequently, the valve bottom groove 132 is an indented ring-shaped groove. The valve bottom groove 132 receives the valve gasket 133. As a result, the valve bottom grove secures the valve gasket 133 in place along the valve plate 13. The plate groove 34 receives the valve gasket 133. Thus, the valve gasket 133 is secured along the bottom with the plate groove 34 of the bottom plate 3. The valve gasket 133 forms a watertight seal between the valve plate 13 and the bottom plate 3. So, the valve gasket 133 allows for liquid to pass through the valve plate 13 while preventing liquid from seeping out radially from in between the valve plate 13 and bottom plate 3.

In reference to FIG. 4, the plurality of ridges 31 integrates along the circumference of the bottom plate 3. Accordingly, the plurality of ridges 31 provides a textured surface enabling a frictional force to rotate the bottom plate 3. The plurality of plate slots 32 traverses through the valve plate 13. In this design each of the plurality of plate slots 32 is designed with a shape matching each of the plurality of valve slots 131. The valve shaft 33 mechanically couples the bottom plate 3 to the valve plate 13. The bottom plate 3 rotates around the valve shaft 33. Consequently, the bottom plate 3 rotates while the valve plate 13 stays stationary. Further, the bottom plate 3 is pushed up against the valve plate 13 to secure the valve gasket 133 in place. The plurality of plate slots 32 aligns to the plurality of valve slots 131 when the bottom plate 3 is rotated to an open position. As a result, when the bottom plate 3 is rotated to an open position liquid passes through the plurality of plate slots 32 and the plurality of valve slots 131, enabling liquid to flow from the top housing 1 to the bottom housing 4 and vice versa.

Further, the bottom plate 3 is able to rotate along the valve shaft 33. The valve shaft 33 extends upwards centrally along the screen housing 43. The valve shaft 33 provides the necessary torque for the bottom plate 3 to rotate upwards scaling up against the valve plate 13. The plate groove 34 integrates along the top of the bottom plate 3 as seen in FIG. 3. The plate groove 34 secures the valve gasket 133 in place along the bottom side of the valve gasket 133.

In reference to FIG. 4, the bottom housing inner thread 41 integrates along the end of the bottom housing 4. The bottom housing inner thread 41 receives the bottom cap outer thread 51. So, the bottom cap 5 interlocks along the bottom housing inner thread 41 to create a seal along the bottom of the bottom housing 4. The bottom internal lip 42 receives the screen housing 43. As a result, the bottom internal lip 42 provides a ledge for the screen housing 43 to sit within the bottom housing 4. The top housing connecting thread 44 integrates along the end of the bottom housing 4 opposite the bottom housing inner thread 41. The top housing connecting thread 44 is positioned along the top of the bottom housing 4 in an area accessible by the top housing 1. The top housing connecting thread 44 receives the bottom housing connecting thread 14. Consequently, the top housing connecting thread 44 interlocks with the bottom housing connecting thread 14, forming a seal and ensuring the bottle housing 6 holds liquid without unwanted leaks. The screen housing 43 further comprises a screen sheet 431 and a cross structure 432.

Further, the screen sheet 431 integrates into the screen housing 43 as seen in FIG. 3. The screen sheet 431 is a filter that enables liquid to pass through while restricting larger objects from passing through, such as coffee grounds and tea leaves. The screen sheet 431 filters liquid passing through the screen housing 43. As the bottom plate 3 rotates to the open position hot water flows from the top housing 1 through the screen sheet 431 and into the bottom housing 4. Within the bottom housing 4 the hot water steeps with the contents within the bottom housing 4 such as coffee grounds or tea leaves. After the desired amount of steeping or infusing is achieved, the bottle housing 6 is flipped upside down wherein the tea or coffee liquid flows out of the bottom housing 4 through the screen sheet 431 and into the top housing 1. At this point, the coffee grounds or tea leaves are prevented from passing through the screen sheet 431 and the bottom plate 3 is rotated to the closed position creating a seal within the top housing 1. The tea or coffee liquid can then be poured into the cup 7 once the top cap 2 is removed to enjoy the desired amount of the created beverage. The cross structure 432 secures the screen sheet 431 within the screen housing 43. Accordingly, the cross structure 432 ensures that the screen sheet 431 does not move while filtering the beverage. Furthermore, the bottom cap 5 closes the bottom of the bottle housing 6. The bottom cap gasket 52 forms a seal between the bottom cap 5 and the bottom housing 4. Prior to rotating the bottom plate 3 to the open position, the bottom housing 4 is accessible through the bottom when the bottom cap 5 is removed, enabling tea leaves or coffee grounds to be placed within the bottom housing 4 before sealing the bottom housing 4 with the bottom cap 5.

Although the invention has been explained in relation to its preferred embodiment, it is to be understood that many other possible modifications and variations can be made without departing from the spirit and scope of the invention as hereinafter claimed.

What is claimed is:
1. A portable bottle infuser comprising:
    a top housing;
    a top cap;
    a bottom plate;
    a bottom housing;
    a cup;
    a bottom cap;
    the top housing comprising a top housing outer thread, a housing slot, a valve plate, and a bottom housing connecting thread;
    the top cap comprising a top cap inner thread;
    the bottom plate comprising a plurality of ridges, a plurality of plate slots, and a plate groove;
    the bottom housing comprising a bottom housing outer thread, a bottom internal lip, a screen housing, a top housing connecting thread and a valve shaft;
    the bottom cap comprising a bottom cap inner thread and a bottom cap gasket;
    the top housing and bottom housing forming a bottle housing;
    the top cap closing along the top of the top housing;
    the bottom cap closing along the bottom of the bottom housing;
    the bottom plate sealing between the valve plate and the screen housing;
    the valve plate further comprising a plurality of valve slots, a valve bottom groove, and a valve gasket;
    the valve plate affixing along the inner surface of the top housing;
    the valve plate being positioned above the housing slot;
    the plurality of valve slots traversing through the valve plate;
    the valve bottom groove integrating into the bottom surface of the valve plate;
    the valve bottom groove receiving the valve gasket;
    the plate groove receiving the valve gasket; and
    the valve gasket forming a watertight seal between the valve plate and the bottom plate.
2. The portable bottle infuser as claimed in claim 1 comprising:
    the top housing outer thread being a spiraling thread along the end of the top housing;
    the top housing outer thread receiving the top cap;

the bottom housing connecting thread being a spiraling thread along the end of the top housing opposite the top housing outer thread;

the bottom housing connecting thread receiving the bottom housing;

the housing slot integrating along the top housing; and the housing slot revealing the plurality of ridges along the bottom plate.

3. The portable bottle infuser as claimed in claim 2 wherein the top cap inner thread interlocking with the top housing outer thread.

4. The portable bottom infuser as claimed in claim 1 comprising:

the plurality of ridges integrating along the circumference of the bottom plate;

the plurality of plate slots traversing through the valve plate;

the valve shaft mechanically coupling the bottom plate to the valve plate;

the bottom plate rotating around the valve shaft; and the plurality of plate slots aligning to the plurality of valve slots when the bottom plate is rotated to an open position.

5. The portable bottle infuser as claimed in claim 4 wherein the plate groove is integrating along the top of the bottom plate.

6. The portable bottle infuser as claimed in claim 1 comprising:

the bottom housing outer thread integrating along the end of the bottom housing;

the bottom housing outer thread receiving the bottom cap inner thread;

the bottom internal lip receiving the screen housing;

the top housing connecting thread integrating along the end of the bottom housing opposite the bottom housing outer thread;

the top housing connecting thread receiving the bottom housing connecting thread; and the screen housing further comprising a screen sheet and a cross structure.

7. The portable bottle infuser as claimed in claim 6 comprising:

the screen sheet integrating into the screen housing;

the screen sheet filtering liquid passing through the screen housing; and the cross structure securing the screen sheet within the screen housing.

8. The portable bottle infuser as claimed in claim 1 comprising:

the bottom cap closing the bottom of the bottle housing; and the bottom cap gasket forming a seal between the bottom cap and the bottom housing.

9. A portable bottle infuser comprising:

a top housing;
a top cap;
a bottom plate;
a bottom housing;
a cup;
a bottom cap;

the top housing comprising a top housing outer thread, a housing slot, a valve plate, and a bottom housing connecting thread;

the top cap comprising a top cap inner thread;

the bottom plate comprising a plurality of ridges, a plurality of plate slots, and a plate groove;

the bottom housing comprising a bottom housing outer thread, a bottom internal lip, a screen housing, a top housing connecting thread and a valve shaft;

the bottom cap comprising a bottom cap inner thread and a bottom cap gasket;

the valve plate further comprising a plurality of valve slots, a valve bottom groove, and a valve gasket;

the top housing and bottom housing forming a bottle housing;

the top cap closing along the top of the top housing;

the bottom cap closing along the bottom of the bottom housing;

the bottom plate sealing between the valve plate and the screen housing;

the plurality of ridges integrating along the circumference of the bottom plate;

the plurality of plate slots traversing through the valve plate;

the valve shaft mechanically coupling the bottom plate to the valve plate;

the bottom plate rotating around the valve shaft;

the plurality of plate slots aligning to the plurality of valve slots when the bottom plate is rotated to an open position; and the plate groove integrating along the top of the bottom plate.

10. The portable bottle infuser as claimed in claim 9 comprising:

the top housing outer thread being a spiraling thread along the end of the top housing;

the top housing outer thread receiving the top cap;

the bottom housing connecting thread being a spiraling thread along the end of the top housing opposite the top housing outer thread;

the bottom housing connecting thread receiving the bottom housing;

the housing slot integrating along the top housing;

the housing slot revealing the plurality of ridges along the bottom plate; and the top cap inner thread interlocking with the top housing outer thread.

11. The portable bottle infuser as claimed in claim 9 comprising:

the valve plate affixing along the inner surface of the top housing;

the valve plate being positioned above the housing slot;

the plurality of valve slots traversing through the valve plate;

the valve bottom groove integrating into the bottom surface of the valve plate;

the valve bottom groove receiving the valve gasket;

the plate groove receiving the valve gasket; and the valve gasket forming a watertight seal between the valve plate and the bottom plate.

12. The portable bottle infuser as claimed in claim 9 comprising:

the bottom housing outer thread integrating along the end of the bottom housing;

the bottom housing outer thread receiving the bottom cap inner thread;

the bottom internal lip receiving the screen housing;

the top housing connecting thread integrating along the end of the bottom housing opposite the bottom housing outer thread;

the top housing connecting thread receiving the bottom housing connecting thread;

the screen housing further comprising a screen sheet and a cross structure;
the screen sheet integrating into the screen housing;
the screen sheet filtering liquid passing through the screen housing; and
the cross structure securing the screen sheet within the screen housing.

13. The portable bottle infuser as claimed in claim 9 comprising:
the bottom cap closing the bottom of the bottle housing; and
the bottom cap gasket forming a seal between the bottom cap and the bottom housing.

14. A portable bottle infuser comprising:
a top housing;
a top cap;
a bottom plate;
a bottom housing;
a cup;
a bottom cap;
the top housing comprising a top housing outer thread, a housing slot, a valve plate, and a bottom housing connecting thread;
the top cap comprising a top cap inner thread;
the bottom plate comprising a plurality of ridges, a plurality of plate slots, and a plate groove;
the bottom housing comprising a bottom housing outer thread, a bottom internal lip, a screen housing, a top housing connecting thread and a valve shaft;
the bottom cap comprising a bottom cap inner thread and a bottom cap gasket;
the top housing and bottom housing forming a bottle housing;
the top cap closing along the top of the top housing;
the bottom cap closing along the bottom of the bottom housing;
the bottom plate sealing between the valve plate and the screen housing;
the bottom plate rotating around the valve shaft;
the top housing outer thread being a spiraling thread along the end of the top housing;
the top housing outer thread receiving the top cap;
the bottom housing connecting thread being a spiraling thread along the end of the top housing opposite the top housing outer thread;
the bottom housing connecting thread receiving the bottom housing;
the housing slot integrating along the top housing;
the housing slot revealing the plurality of ridges along the bottom plate;
the top cap inner thread interlocking with the top housing outer thread;
the bottom housing outer thread integrating along the end of the bottom housing;
the bottom housing outer thread receiving the bottom cap inner thread;
the bottom internal lip receiving the screen housing;
the top housing connecting thread integrating along the end of the bottom housing opposite the bottom housing outer thread;
the top housing connecting thread receiving the bottom housing connecting thread;
the screen housing further comprising a screen sheet and a cross structure;
the screen sheet integrating into the screen housing;
the screen sheet filtering liquid passing through the screen housing;
the cross structure securing the screen sheet within the screen housing;
the bottom cap closing the bottom of the bottle housing; and
the bottom cap gasket forming a seal between the bottom cap and the bottom housing.

15. The portable bottle infuser as claimed in claim 14 comprising:
the valve plate further comprising a plurality of valve slots, a valve bottom groove, and a valve gasket;
the valve plate affixing along the inner surface of the top housing;
the valve plate being positioned above the housing slot;
the plurality of valve slots traversing through the valve plate;
the valve bottom groove integrating into the bottom surface of the valve plate;
the valve bottom groove receiving the valve gasket;
the plate groove receiving the valve gasket; and
the valve gasket forming a watertight seal between the valve plate and the bottom plate.

16. The portable bottom infuser as claimed in claim 14 comprising:
the plurality of ridges integrating along the circumference of the bottom plate;
the plurality of plate slots traversing through the valve plate;
the valve shaft mechanically coupling the bottom plate to the valve plate;
the plurality of plate slots aligning to the plurality of valve slots when the bottom plate is rotated to an open position; and
the plate groove integrating along the top of the bottom plate.

* * * * *